(12) United States Patent
Zhao et al.

(10) Patent No.: US 10,797,490 B2
(45) Date of Patent: Oct. 6, 2020

(54) BATTERY CHARGE SYSTEM WITH TRANSITION CONTROL THAT PROTECTS ADAPTER COMPONENTS WHEN TRANSITIONING FROM BATTERY MODE TO ADAPTER MODE

(71) Applicant: INTERSIL AMERICAS LLC, Milpitas, CA (US)

(72) Inventors: Lei Zhao, Cary, NC (US); Jia Wei, Cary, NC (US); John S. Kleine, Cary, NC (US)

(73) Assignee: Intersil Americas LLC, Milpitas, CA (US)

( * ) Notice: Subject to any disclaimer, the term of this patent is extended or adjusted under 35 U.S.C. 154(b) by 1489 days.

(21) Appl. No.: 14/337,212

(22) Filed: Jul. 21, 2014

(65) Prior Publication Data

US 2015/0280473 A1  Oct. 1, 2015

Related U.S. Application Data

(60) Provisional application No. 61/970,607, filed on Mar. 26, 2014.

(51) Int. Cl.
*H02J 7/00* (2006.01)
*H02J 7/34* (2006.01)
(Continued)

(52) U.S. Cl.
CPC ............... *H02J 7/00* (2013.01); *G06F 1/26* (2013.01); *H02J 1/00* (2013.01); *H02J 7/34* (2013.01); *H02J 1/082* (2020.01); *H02J 2207/20* (2020.01)

(58) Field of Classification Search
CPC .... G06F 1/263; G06F 1/30; G06F 1/26; H02J 1/00; H02J 7/0052; H02J 7/34
(Continued)

(56) References Cited

U.S. PATENT DOCUMENTS 4,010,381 A * 3/1977 Fickenscher ............ H02J 9/062
307/66
4,277,692 A * 7/1981 Small ...................... H02J 9/062
307/66

(Continued)

FOREIGN PATENT DOCUMENTS

JP        02136041 A  *  5/1990
JP        04197047 A  *  7/1992
(Continued)

*Primary Examiner* — John T Trischler
(74) *Attorney, Agent, or Firm* — Foley & Lardner LLP

(57) ABSTRACT

A battery charge system including an adapter node, a system node, a battery, a first isolation switch coupled between the adapter and system nodes, a second isolation switch coupled between the battery and system nodes, a boost converter, and a controller. The controller turns off the first isolation switch and turns on the second isolation switch during a battery mode, activates the boost converter when an adapter voltage is detected, turns off the second isolation switch when the system voltage rises above the battery voltage, and turns on the first isolation switch when the system voltage rises to an operating voltage level. The boost converter may then be turned off once in the adapter mode. The second isolation switch may initially be turned on partially at a low current level when the adapter is detected, and then turned fully on when the system voltage is at the operating voltage level.

21 Claims, 4 Drawing Sheets

(51) Int. Cl.
*H02J 1/00* (2006.01)
*G06F 1/26* (2006.01)
*H02J 1/08* (2006.01)

(58) Field of Classification Search
USPC .......................................... 307/66; 320/107
See application file for complete search history.

(56) References Cited

U.S. PATENT DOCUMENTS

| | | | | |
|---|---|---|---|---|
| 4,287,465 A * | 9/1981 | Godard | .................... | H02J 1/14 307/46 |
| 4,366,389 A * | 12/1982 | Hussey | .................... | H02J 9/062 307/66 |
| 4,400,624 A * | 8/1983 | Ebert, Jr. | .................... | H02J 9/062 307/43 |
| 4,400,625 A * | 8/1983 | Hussey | .................... | H02J 9/062 307/66 |
| 4,475,047 A * | 10/1984 | Ebert, Jr. | .................... | H02J 9/062 307/129 |
| 4,604,530 A * | 8/1986 | Shibuya | .................... | H02J 9/062 307/66 |
| 4,709,318 A * | 11/1987 | Gephart | .................... | H02J 9/062 307/66 |
| 4,782,241 A * | 11/1988 | Baker | .................... | H02J 9/062 307/66 |
| 4,890,005 A * | 12/1989 | Schornack | .................... | H02J 9/062 307/66 |
| 5,055,703 A * | 10/1991 | Schornack | .................... | H02J 9/062 307/64 |
| 5,150,032 A * | 9/1992 | Ho | .................... | G06F 1/263 307/48 |
| 5,424,936 A * | 6/1995 | Reddy | .................... | H02J 9/062 363/97 |
| 5,465,011 A * | 11/1995 | Miller | .................... | H02J 9/062 307/64 |
| 5,579,197 A * | 11/1996 | Mengelt | .................... | H02J 9/062 307/66 |
| 5,585,677 A * | 12/1996 | Cheon | .................... | H02J 9/061 307/43 |
| 5,602,462 A * | 2/1997 | Stich | .................... | G05F 1/147 307/64 |
| 5,610,451 A * | 3/1997 | Symonds | .................... | H02J 9/062 307/64 |
| 5,612,580 A * | 3/1997 | Janonis | .................... | H02J 9/062 307/64 |
| 5,621,299 A * | 4/1997 | Krall | .................... | H01M 10/441 307/66 |
| 5,631,814 A * | 5/1997 | Zak | .................... | H02J 9/061 307/66 |
| 5,635,773 A * | 6/1997 | Stuart | .................... | H02J 9/062 307/66 |
| 5,638,540 A * | 6/1997 | Aldous | .................... | G06F 1/263 713/300 |
| 5,650,669 A * | 7/1997 | Aldous | .................... | G06F 1/263 307/46 |
| 5,684,686 A * | 11/1997 | Reddy | .................... | H02J 9/062 307/66 |
| 5,790,391 A * | 8/1998 | Stich | .................... | H02J 9/062 307/64 |
| 5,834,858 A * | 11/1998 | Crosman, III | .................... | H02J 7/0068 307/66 |
| 5,847,543 A * | 12/1998 | Carroll | .................... | G06F 1/1632 320/125 |
| 5,909,360 A * | 6/1999 | Lavin | .................... | H02J 9/062 307/45 |
| 5,929,538 A * | 7/1999 | O'Sullivan | .................... | H02J 7/1415 307/44 |
| 5,978,236 A * | 11/1999 | Faberman | .................... | H02J 9/061 307/66 |
| 5,994,793 A * | 11/1999 | Bobry | .................... | H02J 9/062 307/64 |
| 6,057,609 A * | 5/2000 | Nagai | .................... | H02J 9/061 307/66 |
| 6,157,168 A * | 12/2000 | Malik | .................... | G06F 1/263 307/66 |
| 6,175,311 B1 * | 1/2001 | Li | .................... | H02J 9/062 307/64 |
| 6,181,029 B1 * | 1/2001 | Berglund | .................... | H02J 9/062 307/66 |
| 6,201,371 B1 * | 3/2001 | Kawabe | .................... | H02J 9/062 307/66 |
| 6,208,118 B1 * | 3/2001 | Li | .................... | H02J 9/061 320/137 |
| 6,265,848 B1 * | 7/2001 | Mukainakano | .................... | H02J 7/0047 307/66 |
| 6,426,606 B1 * | 7/2002 | Purkey | .................... | F02N 11/14 320/103 |
| 6,459,175 B1 * | 10/2002 | Potega | .................... | G06F 1/26 307/149 |
| 6,479,970 B2 * | 11/2002 | Reddy | .................... | H02J 9/062 307/66 |
| 6,577,513 B1 * | 6/2003 | Chang | .................... | H05B 41/2853 307/64 |
| 6,650,027 B1 * | 11/2003 | Ho | .................... | H02J 9/062 307/66 |
| 6,661,678 B2 * | 12/2003 | Raddi | .................... | H02J 9/062 307/64 |
| 6,774,602 B2 * | 8/2004 | Ballard | .................... | H02J 7/0072 320/103 |
| 6,801,023 B2 * | 10/2004 | Wu | .................... | H02J 9/062 323/222 |
| 6,803,678 B2 * | 10/2004 | Gottlieb | .................... | G01R 31/3648 307/66 |
| 6,854,065 B2 * | 2/2005 | Smith | .................... | G06F 1/30 713/300 |
| 6,944,035 B2 * | 9/2005 | Raddi | .................... | H02J 9/062 307/64 |
| 7,002,265 B2 * | 2/2006 | Potega | .................... | B60L 11/185 307/149 |
| 7,039,821 B1 * | 5/2006 | Potega | .................... | G06F 1/1632 327/100 |
| 7,049,711 B2 * | 5/2006 | Kanouda | .................... | H02J 9/061 307/66 |
| 7,082,040 B2 * | 7/2006 | Raddi | .................... | H02J 9/062 307/64 |
| 7,127,623 B2 * | 10/2006 | Potega | .................... | G06F 1/1632 713/300 |
| 7,160,113 B2 * | 1/2007 | McConnell | .................... | G09B 7/00 320/107 |
| 7,199,489 B2 * | 4/2007 | Gottlieb | .................... | G01R 31/3648 307/66 |
| 7,252,088 B1 * | 8/2007 | Nieves-Ramirez | .................... | A61M 16/0051 128/204.18 |
| 7,259,477 B2 * | 8/2007 | Klikic | .................... | H02J 9/062 307/14 |
| 7,274,112 B2 * | 9/2007 | Hjort | .................... | H02J 9/062 307/64 |
| 7,432,617 B2 * | 10/2008 | Kanouda | .................... | H02J 9/061 307/66 |
| 7,446,433 B2 * | 11/2008 | Masciarelli | .................... | H02J 9/062 307/66 |
| 7,453,169 B2 * | 11/2008 | Grundmann | .................... | G01R 31/40 307/64 |
| 7,456,518 B2 * | 11/2008 | Hjort | .................... | H02J 9/062 307/64 |
| 7,521,823 B2 * | 4/2009 | Klikic | .................... | H02J 9/062 307/66 |
| 7,573,151 B2 * | 8/2009 | Acena | .................... | B60L 11/005 307/9.1 |
| 7,615,890 B2 * | 11/2009 | Masciarelli | .................... | H02J 9/062 307/66 |
| 7,656,623 B2 * | 2/2010 | Fadell | .................... | G06F 1/266 320/106 |
| 7,679,943 B2 * | 3/2010 | O'Bryant | .................... | H02J 9/061 363/65 |

(56) References Cited

U.S. PATENT DOCUMENTS

| | | | |
|---|---|---|---|
| 7,688,048 B2* | 3/2010 | Nielsen | H02J 1/102 307/151 |
| 7,705,489 B2* | 4/2010 | Nielsen | H02J 9/062 307/66 |
| 7,737,580 B2* | 6/2010 | Hjort | H02J 7/0047 307/46 |
| 7,763,993 B2* | 7/2010 | Groff | H02J 7/0024 307/66 |
| 7,764,050 B2* | 7/2010 | Xing | H02J 7/0068 320/137 |
| 7,773,375 B1* | 8/2010 | Faucett | G06F 1/181 307/149 |
| 7,802,121 B1* | 9/2010 | Zansky | G06F 1/263 307/64 |
| 7,843,676 B2* | 11/2010 | Klikic | H02J 9/062 361/79 |
| 7,855,472 B2* | 12/2010 | Hjort | H02J 7/0047 307/64 |
| 7,872,373 B2* | 1/2011 | Henkel | H02J 9/06 307/64 |
| 7,872,374 B2* | 1/2011 | Gottlieb | G01R 31/3648 307/66 |
| 7,872,450 B1* | 1/2011 | Cohen | H02J 7/0068 320/134 |
| 7,881,079 B2* | 2/2011 | Prasad | H02M 1/4208 323/266 |
| 7,886,173 B2* | 2/2011 | Krieger | H02J 9/061 713/330 |
| 7,939,968 B2* | 5/2011 | Hjort | H02J 9/062 307/46 |
| 7,940,026 B2* | 5/2011 | Fadell | G06F 1/266 320/128 |
| 8,008,809 B2* | 8/2011 | Nielsen | H02J 1/102 307/82 |
| 8,035,356 B2* | 10/2011 | Mentelos | H02J 9/061 320/166 |
| 8,036,004 B2* | 10/2011 | Morishima | H02J 9/061 363/55 |
| 8,053,927 B2* | 11/2011 | Hjort | H02J 7/0047 307/64 |
| 8,080,900 B2* | 12/2011 | Corhodzic | G06F 1/263 307/64 |
| 8,115,338 B2* | 2/2012 | Medugno | H02J 9/061 307/66 |
| 8,134,811 B2* | 3/2012 | Klikic | H02J 9/062 361/13 |
| 8,143,744 B2* | 3/2012 | Nielsen | H02J 9/062 307/66 |
| 8,148,846 B2* | 4/2012 | Masciarelli | H02J 9/062 307/26 |
| 8,212,402 B2* | 7/2012 | Rodenhiser | H02J 9/062 307/64 |
| 8,299,648 B2* | 10/2012 | Morishima | H02J 9/00 307/66 |
| 8,344,551 B2* | 1/2013 | Nielsen | H02J 1/102 307/82 |
| 8,350,532 B2* | 1/2013 | Caraghiorghiopol | G06F 1/263 320/140 |
| 8,368,346 B2* | 2/2013 | Batson | H02J 7/0045 320/103 |
| 8,374,012 B2* | 2/2013 | Raptis | H02J 9/062 307/23 |
| 8,385,091 B2* | 2/2013 | Nielsen | H02J 9/062 363/37 |
| 8,386,809 B2* | 2/2013 | Spitaels | G06F 9/4443 307/64 |
| 8,450,876 B2* | 5/2013 | Rodenhiser | H02J 9/062 307/64 |
| 8,492,928 B2* | 7/2013 | Pyboyina | H02J 9/062 307/64 |
| 8,503,201 B2* | 8/2013 | Reilly | H02M 1/34 363/125 |
| 8,558,510 B2* | 10/2013 | Moon | H02J 3/32 307/25 |
| 8,581,551 B2* | 11/2013 | Seo | G06F 1/26 320/101 |
| 8,604,640 B2* | 12/2013 | Masciarelli | H02J 9/062 307/66 |
| 8,624,433 B2* | 1/2014 | Whitted | H02J 9/061 307/64 |
| 8,664,796 B2* | 3/2014 | Nielsen | H02J 1/102 307/46 |
| 8,766,590 B2* | 7/2014 | Lee | H02J 3/32 320/101 |
| 8,786,270 B2* | 7/2014 | Wu | H02M 3/156 323/282 |
| 8,791,597 B2* | 7/2014 | Chen | H02J 9/062 307/64 |
| 8,803,361 B2* | 8/2014 | Johansen | H02J 9/062 307/64 |
| 8,854,004 B2* | 10/2014 | Lee | H02J 3/383 320/101 |
| 8,872,380 B2* | 10/2014 | Shim | H01M 10/425 307/64 |
| 8,878,389 B2* | 11/2014 | Dighrasker | H02J 9/062 307/66 |
| 8,938,323 B2* | 1/2015 | Lee | G06F 1/30 700/291 |
| 9,035,609 B1* | 5/2015 | Kim | H02J 1/10 320/107 |
| 9,065,277 B1* | 6/2015 | Kim | H02J 9/00 |
| 9,106,103 B2* | 8/2015 | Paulakonis | H02J 7/345 |
| 9,178,382 B2* | 11/2015 | Mao | H02J 7/0068 |
| 9,225,202 B1* | 12/2015 | Kim | H02J 9/061 |
| 9,234,916 B2* | 1/2016 | Peck | H02J 9/061 |
| 9,236,752 B2* | 1/2016 | Bajaj | H02J 7/0052 |
| 9,276,410 B2* | 3/2016 | Binder | H02J 3/383 |
| 9,285,434 B2* | 3/2016 | Lin | G01R 31/40 |
| 9,312,726 B2* | 4/2016 | Heidenreich | H02J 9/062 |
| 9,356,323 B2* | 5/2016 | Kim | H01M 10/443 |
| 9,373,977 B1* | 6/2016 | Kim | H02J 9/00 |
| 9,806,559 B2* | 10/2017 | Mao | H02M 3/1582 |
| 2001/0015576 A1* | 8/2001 | Crosman, III | H02J 7/0068 307/66 |
| 2001/0045779 A1* | 11/2001 | Lee | H02J 9/061 307/66 |
| 2001/0054878 A1* | 12/2001 | Odaohhara | G06F 1/263 320/118 |
| 2002/0041174 A1* | 4/2002 | Purkey | F02N 11/14 320/103 |
| 2002/0079742 A1* | 6/2002 | Crosman, III | H02J 7/0068 307/64 |
| 2002/0140403 A1* | 10/2002 | Reddy | H02J 9/062 320/162 |
| 2003/0072977 A1* | 4/2003 | Speranza | H01M 8/04567 429/9 |
| 2003/0085621 A1* | 5/2003 | Potega | G06F 1/263 307/18 |
| 2003/0205939 A1* | 11/2003 | Crosman, III | H02J 7/0068 307/64 |
| 2003/0231003 A1* | 12/2003 | Ballard | H02J 7/0072 320/116 |
| 2004/0174139 A1* | 9/2004 | Sawyers | G06F 1/263 320/116 |
| 2005/0105229 A1* | 5/2005 | Deng | H02J 9/062 361/90 |
| 2005/0162123 A1* | 7/2005 | Sawyers | G06F 1/263 320/103 |
| 2005/0254273 A1* | 11/2005 | Soudier | H02M 3/335 363/103 |
| 2006/0005055 A1* | 1/2006 | Potega | G06F 1/1632 713/300 |
| 2006/0043792 A1* | 3/2006 | Hjort | H02J 9/062 307/1 |
| 2006/0043793 A1* | 3/2006 | Hjort | H02J 9/062 307/1 |
| 2007/0229035 A1* | 10/2007 | Fukute | G01R 31/3648 320/132 |

(56) References Cited

U.S. PATENT DOCUMENTS

| | | | |
|---|---|---|---|
| 2007/0278860 A1* | 12/2007 | Krieger | H02J 9/061 307/64 |
| 2008/0030078 A1* | 2/2008 | Whitted | H02J 9/061 307/66 |
| 2008/0061628 A1* | 3/2008 | Nielsen | H02J 9/062 307/66 |
| 2008/0088183 A1* | 4/2008 | Eckroad | H02J 3/16 307/66 |
| 2008/0111425 A1* | 5/2008 | Chang | H02J 9/02 307/66 |
| 2009/0021078 A1* | 1/2009 | Corhodzic | G06F 1/263 307/67 |
| 2009/0066287 A1* | 3/2009 | Pollack | G06Q 50/00 320/101 |
| 2009/0212632 A1* | 8/2009 | Medugno | H02J 9/061 307/66 |
| 2009/0251100 A1* | 10/2009 | Incledon | H02J 7/0026 320/106 |
| 2009/0251106 A1* | 10/2009 | Samstad | H02J 7/0052 320/141 |
| 2010/0156354 A1* | 6/2010 | Nielsen | H02J 1/102 320/137 |
| 2010/0295374 A1* | 11/2010 | Nielsen | H02J 9/062 307/66 |
| 2011/0133559 A1* | 6/2011 | Yamashita | G06F 1/30 307/66 |
| 2011/0140648 A1* | 6/2011 | Lee | H02J 3/32 320/101 |
| 2011/0187199 A1* | 8/2011 | Gietzold | H02P 9/02 307/75 |
| 2011/0215646 A1* | 9/2011 | Morishima | H02J 9/00 307/66 |
| 2011/0234151 A1* | 9/2011 | Uan-Zo-Ii | G06F 1/263 320/107 |
| 2012/0013175 A1* | 1/2012 | Newman, Jr. | B60R 16/033 307/9.1 |
| 2012/0086277 A1* | 4/2012 | Hjort | H02J 9/062 307/66 |
| 2012/0091965 A1* | 4/2012 | Seo | G06F 1/26 320/128 |
| 2012/0175958 A1* | 7/2012 | Dighrasker | H02J 9/062 307/66 |
| 2012/0176088 A1* | 7/2012 | Lee | H02J 3/383 320/128 |
| 2013/0082662 A1* | 4/2013 | Carre | H02J 7/0052 320/134 |
| 2013/0113418 A1* | 5/2013 | Ishibashi | H02M 1/36 320/107 |
| 2013/0141051 A1* | 6/2013 | Kang | H02J 7/34 320/134 |
| 2013/0234645 A1* | 9/2013 | Goei | H02J 7/0052 320/101 |
| 2013/0271078 A1* | 10/2013 | Honjo | B60L 11/1824 320/109 |
| 2014/0070618 A1* | 3/2014 | Bajaj | H02J 7/0052 307/66 |
| 2014/0077768 A1* | 3/2014 | Jung | G06F 13/42 320/134 |
| 2014/0159494 A1* | 6/2014 | Binder | H02J 3/383 307/66 |
| 2014/0176076 A1* | 6/2014 | Momo | H01M 10/46 320/128 |
| 2014/0197778 A1* | 7/2014 | Kim | H01M 10/443 320/107 |
| 2014/0354234 A1* | 12/2014 | Sudan | H02J 7/34 320/127 |
| 2015/0134980 A1* | 5/2015 | Chen | G06F 1/263 713/300 |
| 2015/0208331 A1* | 7/2015 | Bridges | B60L 11/1824 455/434 |
| 2015/0318718 A1* | 11/2015 | Ishibashi | H02J 3/32 320/128 |

FOREIGN PATENT DOCUMENTS

| | | |
|---|---|---|
| JP | 04322135 A * | 11/1992 |
| JP | 08065917 A * | 3/1996 |
| JP | 4819762 B2 * | 11/2011 |
| JP | 4998823 B2 * | 8/2012 |
| KR | 20080049210 A * | 6/2008 |

* cited by examiner

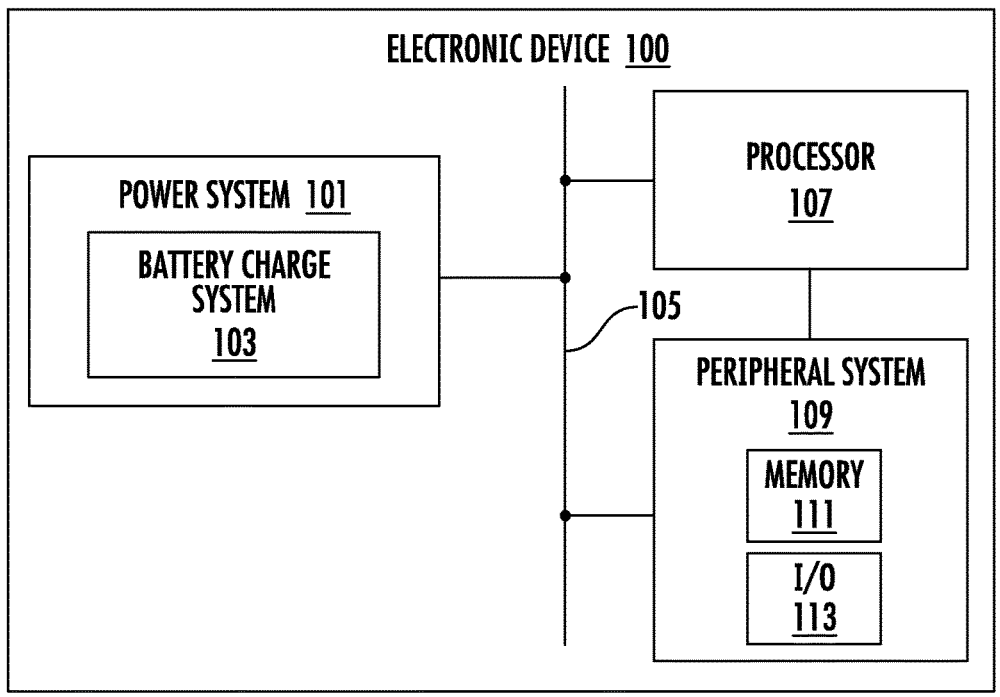
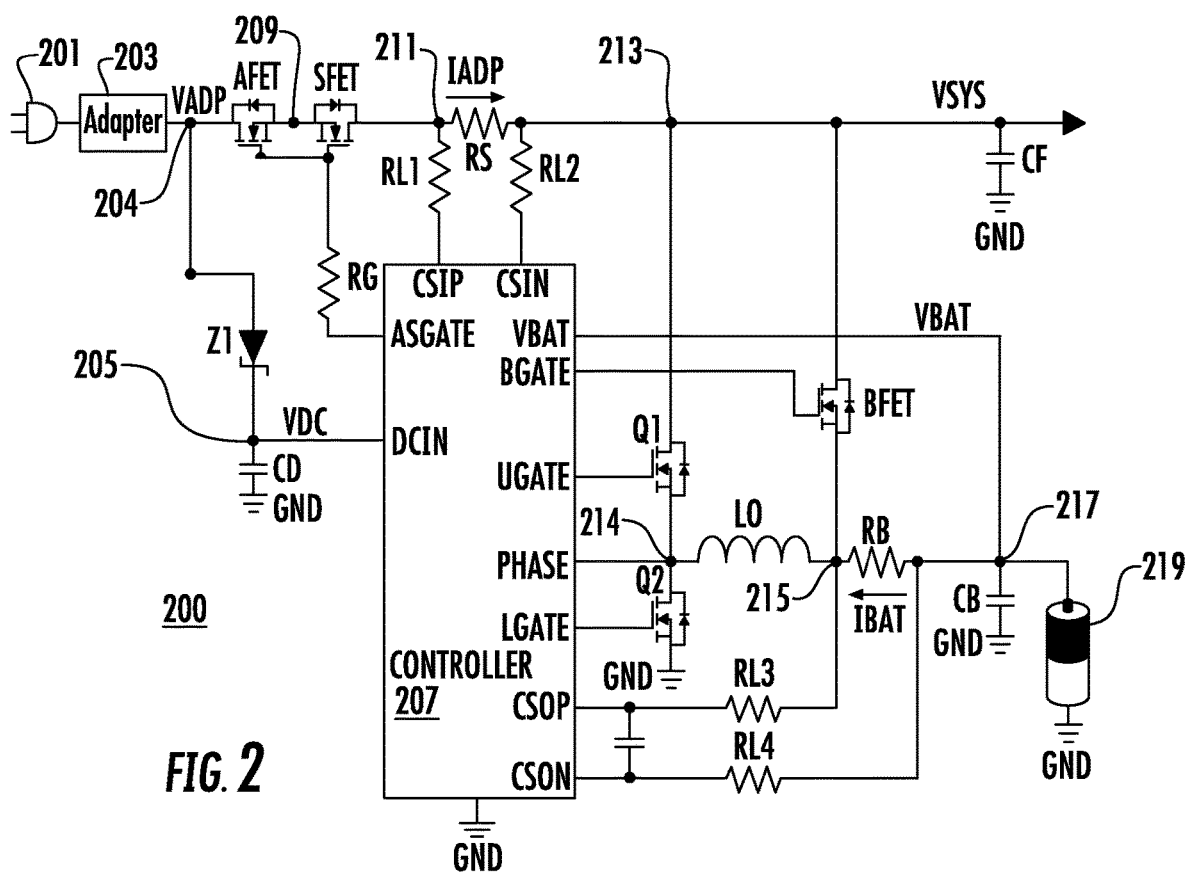
FIG. 1
FIG. 2

BATTERY CHARGE SYSTEM WITH TRANSITION CONTROL THAT PROTECTS ADAPTER COMPONENTS WHEN TRANSITIONING FROM BATTERY MODE TO ADAPTER MODE

CROSS-REFERENCE TO RELATED APPLICATIONS

This application claims the benefit of U.S. Provisional Application Ser. No. 61/970,607, filed on Mar. 26, 2014 which is hereby incorporated by reference in its entirety for all intents and purposes.

BRIEF DESCRIPTION OF THE DRAWINGS

The benefits, features, and advantages of the present invention will become better understood with regard to the following description and accompanying drawings, in which:

FIG. 1 is a simplified block diagram of an electronic device configured with a power system including a battery charge system implemented according to an embodiment of the present invention;

FIG. 2 is a schematic diagram of a battery charge system according to one embodiment which may be used as the battery charge system of FIG. 1;

DETAILED DESCRIPTION

Figure 3:
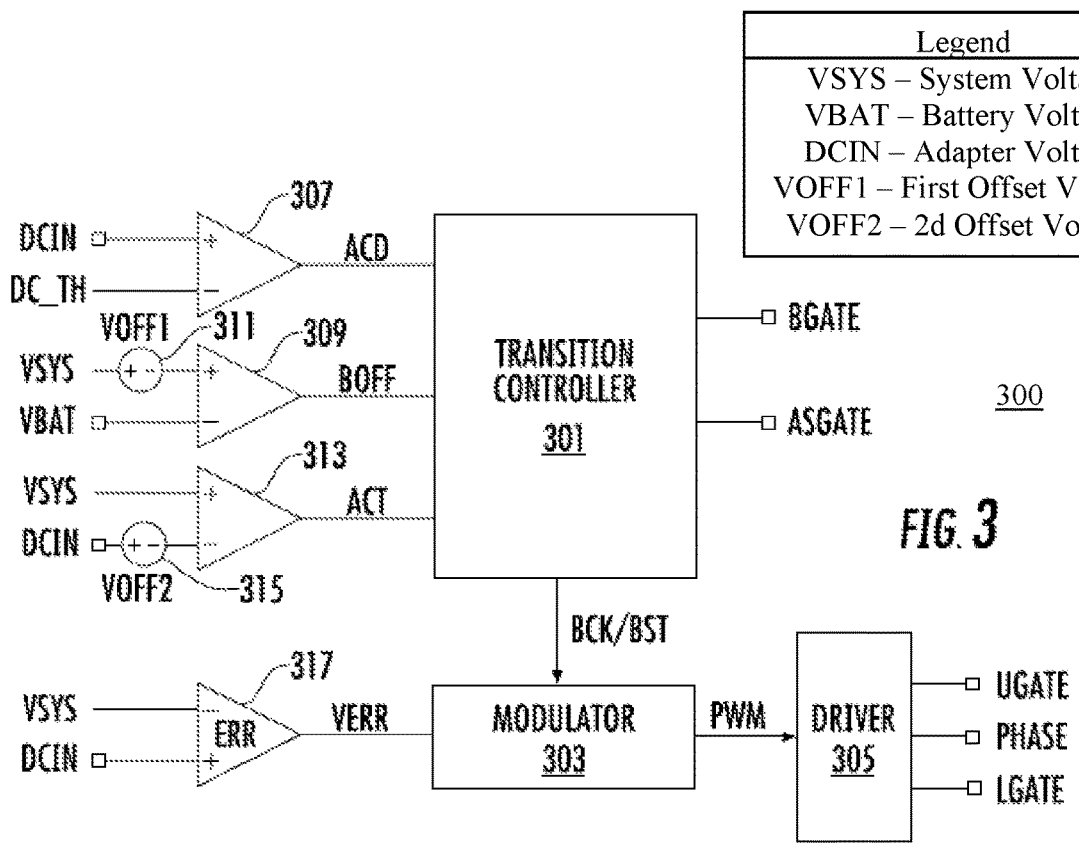
FIG. 3 is a simplified schematic and block diagram of a transition control system that may be implemented within the controller of FIG. 2 according to one embodiment.

In a typical battery charge system, a battery may supply the system load when alternating-current (AC) power is not available or is otherwise not connected. An AC to direct-current (DC) (AC/DC) adapter converts AC power to a DC voltage level for providing the AC power. When the system is plugged into the AC/DC adapter, the battery charge system transitions the system load from the battery to the DC output of the AC/DC adapter. The battery charge system may include isolation devices that prevent conflict or otherwise enable cooperation between multiple sources of power, such as the battery and the AC/DC adapter. For example, isolation devices are controlled to transition the power source from the battery to the AC/DC adapter when connected.

It has been observed, however, that if the system load is high and/or the battery voltage is low during the transition to the higher voltage output of the AC/DC adapter, the isolation devices may be exposed to a significant power surge when activated. Under various conditions, the power stress may be beyond the power rating of the isolation devices, which may cause damage to the devices or other components or failure of the system.

One possible solution is to reduce the power stress by controlling the adapter current with the isolation devices. This solution does not cover all of the possible different operating conditions and thus does not guarantee proper operation under various scenarios. Another solution is to increase the power rating of the isolation devices. This latter solution, however, limits selection of isolation devices and/or significantly increases cost.

FIG. 1 is a simplified block diagram of an electronic device 100 configured with a power system 101 including a battery charge system 103 implemented according to an embodiment of the present invention. The power system 101 develops one or more supply voltages which provide power to other system devices of the electronic device 100. In the illustrated embodiment, the electronic device 100 includes a processor 107 and a peripheral system 109, both coupled to receive supply voltages from the power system 101 via a supply bus 105, which includes any combination of power and/or signal conductors. In the illustrated embodiment, the peripheral system 109 may include any combination of a system memory 111, such as any combination of random-access memory (RAM) and/or read-only memory (ROM) type devices and memory controllers and the like, and an input/output (I/O) system 113, which may include system and peripheral controllers and the like, such as graphic controllers, interrupt controllers, keyboard and mouse controllers, system storage device controllers (e.g., controllers for hard disk drives and the like), etc. The illustrated system is exemplary only, since many of the processor system and support devices may be integrated onto the processor chip as understood by those skilled in the art.

The electronic device 100 may be any type of computer or computing device, such as a computer system (e.g., notebook computer, desktop computer, netbook computer, etc.), a media tablet device (e.g., iPad by Apple Inc., Kindle by Amazon.com, Inc., etc.), a communication device (e.g., cellular phone, smartphone, etc.), among other types of electronic devices (e.g., media player, recording device, etc.). The battery charge system 103 is configured to include a rechargeable battery 219 (FIG. 2) and may be configured to operate with an AC/DC adapter 203 or the like.

FIG. 2 is a schematic diagram of a battery charge system 200 according to one embodiment which may be used as the battery charge system 103. An AC source 201 (represented as an AC plug) provides an AC voltage to the AC/DC adapter 203, which converts the AC voltage to DC adapter voltage VADP on an adapter node 204. The adapter node 204 represents a coupling interface between the battery charge system 200 and the AC/DC adapter 203. The adapter node 204 providing VADP is coupled to the anode of a diode Z1, having its cathode coupled to a node 205. Node 205 is coupled to one end of a filter capacitor CD and to a DC input pin DCIN of a controller 207. The other end of the capacitor CD is coupled to a common supply reference node, such as ground (GND). Node 205 develops a DC detect voltage VDC when the AC/DC adapter 203 is connected. In one embodiment, VDC develops the same voltage level as VADP in which Z1 is provided for adapter voltage polarity reverse protection. The controller 207 receives VDC via the DCIN pin for detecting the presence of the AC/DC adapter 203 coupled and providing the AC adapter voltage VADP. The controller 207 includes a GND pin externally coupled to GND.

The adapter node 204 is further coupled to the drain of an N-channel field-effect transistor (NFET) AFET, which has its gate coupled, via a gate resistor RG, to a gate drive output ASGATE of the controller 207. The source of AFET is coupled to a common source node 209, which is further coupled to the source of another NFET SFET. The gate of SFET is coupled to the gate of AFET and its drain is coupled to a node 211. Node 211 is further coupled to one end of a limit resistor RL1 and to one end of a current sense resistor RS. The other end of RS is coupled to one end of another limit resistor RL2 and to a system node 213 developing a system voltage VSYS. The other end of RL1 is provided to a positive input current sense pin CSIP and the other end of RL2 is provided to a negative input current sense pin CSIN of the controller 207. The controller 207 may be implemented on a separate integrated circuit (IC) device or semiconductor chip with input/output (I/O) terminals or pins or the like. Alternatively, the controller 207 may be implemented using discrete logic and components or the like.

VSYS is filtered by a capacitor CF coupled between the system node VSYS and GND. VSYS may be provided directly to other system components via bus 105 in one configuration, or to additional systems of the power system 101, such as a voltage regulator (not shown), which converts VSYS to a regulated voltage provided on the bus 105 to provide power to system devices of the electronic device 100 (e.g., the processor 107 and/or the peripheral system 109). Thus VSYS provides power to at least a portion of the load of the electronic device 100.

AFET and SFET are coupled in a back-to-back configuration in which AFET isolates the AC/DC adapter 203 from the battery 219 and battery charge circuitry (described further herein) and SFET blocks battery current from flowing to the AC/DC adapter 203 when AFET and SFET are both turned off by the controller 207. When the AC/DC adapter 203 is coupled and the AFET and SFET are both turned on by the controller 207, the voltage VADP provides adapter current IADP to node 213 for providing load current to the load, in which IADP flows through sense resistor RS and is sensed by the controller 207 via the CSIP and CSIN pins.

The system node 213 developing VSYS is coupled to the drain of another NFET Q1, having its source coupled to a phase node 214 further coupled to a PHASE pin of the controller 207. The gate of Q1 is coupled to an upper gate drive output UGATE of the controller 207. The phase node 214 is further coupled to the drain of another NFET Q2 and to one end of an output inductor LO. Q2 has its gate coupled to a lower gate drive output LGATE of the controller 207 and has its source coupled to GND. The other end of the output inductor LO is coupled to a node 215, which is further coupled to the source of another NFET BFET and to one end of a battery sense resistor RB. The drain of BFET is coupled to the system node 213 and its gate is coupled to a gate drive output BGATE of the controller 207. BFET is a battery switch that is operated by the controller 207 depending upon the operating configuration and the state of the battery 219 as further described herein. The other end of RB is coupled to a battery interface node 217, which is further coupled to a VBAT input pin of the controller 207. When the battery 217 is provided, its positive terminal couples to the battery node 217 and its negative terminal is coupled to GND. A capacitor CB is coupled between node 217 and GND for filtering VBAT. A battery current IBAT is shown flowing through the resistor RB from node 217 to node 215. Node 215 is shown coupled to a positive output current sense pin CSOP of the controller 207 via a limit resistor RL3. Node 217 is shown coupled to a negative output current sense pin CSON of the controller 207 via a limit resistor RL3.

Additional supporting circuitry of the system and additional pins of the controller 207 may be included but are not shown or described as not necessary for a full and complete understanding of the present invention.

The transistors AFET, SFET, BFET, Q1 and Q2 are each shown as a metal-oxide semiconductor, field-effect transistor (MOSFET), although alternative power switching devices or electronic switches are contemplated, such as similar forms (e.g., FETs, MOS devices, P-Channel field effect transistors, etc.), bipolar junction transistors (BJTs) and the like, insulated-gate bipolar transistors (IGBTs) and the like, etc. Each transistor device is sized and configured to perform the intended function.

Q1 and Q2 are electronic switches that together with the inductor LO form a switching converter controlled by the controller 207. The controller 207 may operate the switching converter as a buck converter using VSYS as an input voltage to generate VBAT as an output voltage to charge the battery 219. Also, the controller 207 may operate the switching converter as a boost converter using VBAT as the input voltage and VSYS as the output voltage. In the boost mode of operation, the switching converter boosts the voltage level of VSYS to a voltage higher than VBAT.

In general, when the AC/DC adapter 203 and the battery 219 are both absent or disconnected, then there is no power source and power is shut down. When the AC/DC adapter 203 is present and the battery 219 is absent or disconnected, then the controller 207 turns AFET and SFET on and BFET off and the adapter voltage VADP is used to develop the system voltage VSYS. When the battery 219 is present and contains sufficient charge, and the AC/DC adapter 203 is absent or disconnected, then the controller turns AFET and SFET off and BFET on and the battery voltage VBAT is used to develop the system voltage VSYS. If VBAT falls below a predetermined minimum voltage level VSYS_MIN, then the battery 217 is unable to provide sufficient power and the system may be shut down (similar to both AC/DC adapter 203 and battery 219 not being present).

When the AC/DC adapter 203 and the battery 219 are both present, then the controller 207 turns AFET and SFET on and BFET off, and the controller 207 may operate the switching converter (Q1, Q2 and LO) as a buck converter for charging the battery 219 until fully charged. The controller 207 may also operate the switching converter in the boost mode to boost the voltage level of VSYS above the voltage level of VBAT (or the battery voltage is boosted by the switching converter). The switching converter may operate without the AC/DC adapter 203 during a transition mode between battery operation and adapter operation as further described herein. A turbo or boost mode is also contemplated, in which case both the AC/DC adapter 203 and the battery 219 operate together to develop VSYS to provide power to the system when the load is heavy.

The battery 219 may be configured in any of many suitable configurations. In one embodiment, the battery 219 may have 2-4 battery cells for developing the battery voltage VBAT. A two-cell battery may have an operative voltage range of about 4.5-5.5 Volts (V) to a fully charged voltage level of about 8.4V. A minimum voltage level VSYS_MIN may be defined for VSYS, such as, for example, 4.5V or the like. A four-cell battery may have a voltage range down to VSYS_MIN and up to a fully charged level of about 16.8V. When the battery 219 has a voltage of at least VSYS_MIN and is providing power to the system without the AC/DC adapter 203, then the voltage of VSYS generally follows the voltage level of VBAT minus any voltage drop through RB and BFET. In one embodiment, VADP is about 19V, although any other suitable voltage level is contemplated. The voltage of VSYS is about the same as VADP when the AC/DC adapter 203 is coupled and providing power.

FIG. 3 is a simplified schematic and block diagram of a transition control system 300 that may be implemented within the controller 207 according to one embodiment. The transition control system 300 is shown in simplified form for illustrating transition control according to one embodiment and additional functions or operations of the controller 207 are not shown nor described. The transition control system 300 includes a transition controller 301 that controls a modulator 303, in which the modulator 303 provides a pulse-width modulation (PWM) signal to a driver 305. As shown, the transition controller 301 provides a buck/boost signal BCK/BST to the modulator 303, which may operate the switches Q1 and Q2 in either a buck mode or a boost mode. The buck mode of operation is used for converting the voltage of VSYS as an input to a charge voltage on node 215 for charging the battery 219. The boost mode of operation is used to boost the voltage VBAT of the battery 219 to drive the voltage of VSYS as further described herein. The driver 305 is coupled to the UGATE, LGATE and PHASE pins for controlling switching operation of Q1 and Q2 based on the PWM signal and the mode of switching operation (buck versus boost).

The transition control system 300 further includes a comparator 307 that compares the voltage of the DCIN pin with a DC threshold voltage level DC_TH for providing an AC detect signal ACD to an input of the transition controller 301. When the AC/DC adapter 203 is plugged in, the capacitor CD is charged by VADP via Z1 to the voltage level of VDC. DC_TH is a threshold voltage level that is less than the normal voltage level of VDC, so that when VDC rises above DC_TH, the comparator 307 asserts ACD so that the transition controller 301 detects the presence of the AC/DC adapter 203.

The transition control system 300 further includes another comparator 309 that compares the voltage level of VSYS with the voltage level (VBAT) of the battery 219 via the VBAT pin for providing a battery off signal BOFF to an input of the transition controller 301. It is noted that VSYS may be provided directly via a pin on the controller 207. Alternatively, the voltage level of VSYS may be detected indirectly via another pin, such as CSIN, CSIP or other pin capable of providing or enabling deriving the voltage level of VSYS. A voltage source 311 may further be provided developing an offset voltage VOFF1 relative to VSYS for comparing with VBAT. Thus, when the voltage level of VSYS rises above VBAT by the offset voltage VOFF1 (or when VSYS≥VBAT+VOFF1), the comparator 309 asserts BOFF high.

The transition control system 300 further includes another comparator 313 that compares the voltage of VSYS with a threshold voltage level related to VADP for providing an AC (or adapter) transition signal ACT to an input of the transition controller 301. In the illustrated embodiment, the threshold voltage level is developed by the voltage level of the DCIN pin (or VDC) minus an offset voltage VOFF2 provided by another voltage source 315. In this manner, when the voltage level of VSYS reaches the voltage of the VDC-VOFF2, the comparator 313 asserts ACT high. The threshold voltage level is sufficiently close to the voltage level of VADP (e.g., VOFF2 is sufficient small) such that it is safe to turn AFET and SFET on without causing damage or harm. The ACT signal transitions when the voltage of VSYS reaches a predetermined operating voltage level.

The transition control system 300 further includes an error amplifier 317 developing an error voltage VERR indicative of the voltage difference between VSYS and the voltage level of VDC received via the DCIN pin. VERR is provided to an input of the modulator 303 for controlling the PWM signal for controlling switching operation of Q1 and Q2. In one embodiment, when the transition controller 301 asserts the BCK/BST signal to indicate the boost mode, the modulator 303 operates Q1 and Q2 as a boost switcher to boost the voltage level of VSYS using VBAT from the battery 219 as the input source voltage. The error amplifier 317 causes the modulator 303 to "regulate" the level of VSYS up to the voltage level of VDC, which may be the adapter voltage VADP.

Figure 4:
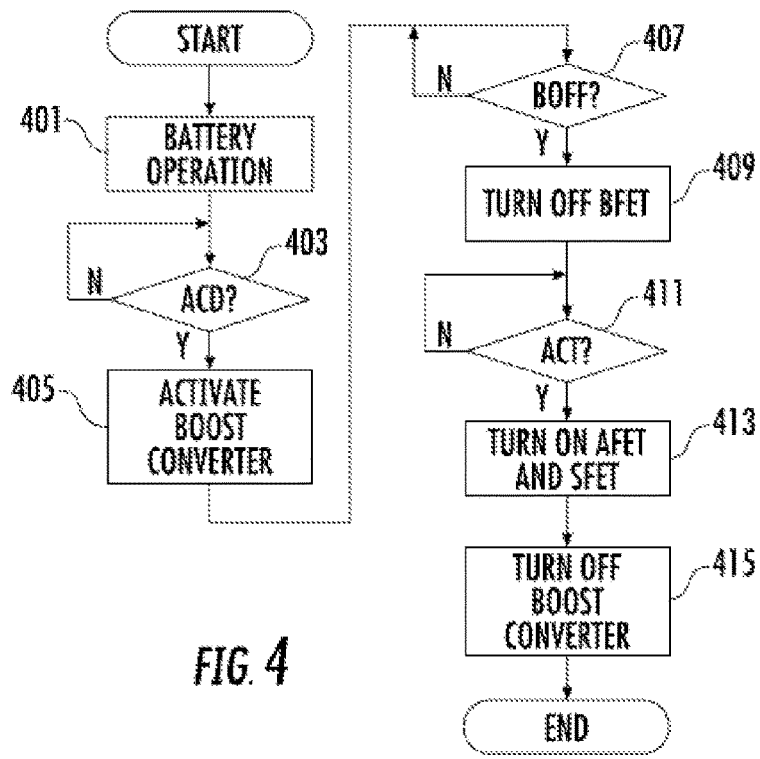
FIG. 4 is a flowchart diagram illustrating operation of the transition control system of FIG. 3 according to one embodiment.

FIG. 4 is a flowchart diagram illustrating operation of the transition control system 300 according to one embodiment. The transition control system 300 is initially configured for battery operation as shown at block 401 when the battery 219 is providing power via BFET and the AC/DC adapter 203 is not detected. In this initial mode, the transition controller 301 asserts BGATE high so that BFET is turned on, and negates ASGATE or otherwise asserts ASGATE low to fully turn off AFET and SFET. The transition controller 301 continuously or otherwise periodically queries the ACD signal as shown at next block 403 to determine whether the AC/DC adapter 203 is detected. While ACD is false (or logically low) indicating that the AC/DC adapter 203 is not detected, operation loops at block 403.

When the AC/DC adapter 203 is connected, the voltage of the DCIN pin rises above DC_TH and the comparator 307 asserts ACD. When ACD is asserted as detected by the transition controller 301 at block 403, operation of the transition controller 301 advances to block 405 to activate the switching converter as a boost converter, such as by asserting the BCK/BST signal to the modulator 303 to indicate the boost mode of operation. In boost mode, the modulator 303 operates Q1 and Q2 in boost mode using the battery voltage VBAT as the input voltage and VSYS as the output voltage. The VSYS voltage begins at or below VBAT since being sourced by the battery 219. As boost operation proceeds, the voltage of VSYS rises above VBAT. Operation proceeds to block 407 to monitor BOFF. While BOFF is false (or asserted low), operation loops at block 407.

In one embodiment, when the boost mode is initially activated, BFET is still on so that the battery 219 is providing source power directly via BFET and indirectly via Q1 and Q2 operating in boost mode. Operation of boost switching may ramp up by a selected rate to facilitate a smooth transition for activating boost switching. The resistor RB allows the voltage of VSYS to rise above VBAT. The voltage VOFF1 is sufficiently small such that when VSYS rises by a small amount above VBAT, the comparator 309 asserts BOFF.

When BOFF is asserted high as detected at block 407, operation advances to block 409 in which the transition controller 301 turns off BFET such as by pulling BGATE low. In this manner, the battery 219 continues to provide power to VSYS via boost control operation of Q1 and Q2. The error amplifier 317 causes the modulator to drive the voltage of VSYS up to the adapter voltage level VADP. Operation of the transition controller 301 advances to block 411 to monitor ACT. While ACT is false (or asserted low), operation loops at block 411.

When the voltage level of VSYS rises sufficiently close to the adapter voltage level, such as within VOFF2, the comparator 313 asserts ACT. When ACT is asserted, operation advances to block 413 in which the transition controller 301 asserts ASGATE high to turn on AFET and SFET. Since the voltage level of VSYS has been driven up to about the voltage level of VADP, AFET and SFET may be safely activated without jeopardizing these isolation devices. In this manner, the VADP voltage provides the source power from the AC/DC adapter 203. Operation further advances to block 415 in which the transition controller 301 may terminate operation of boost converter, so that the battery 219 is no longer sourcing power to the system.

In one embodiment based on the voltage level of VBAT, the modulator 303 may transition to a buck mode of operation to charge the battery 219. In another embodiment, if the system is operating at high load and if the voltage of VBAT is sufficiently high indicating that the battery 219 has sufficient power available, boost operation may continue for so long as necessary (or at least until the battery 219 is depleted) to handle the higher load together with the AC/DC adapter 203.

Figure 5:
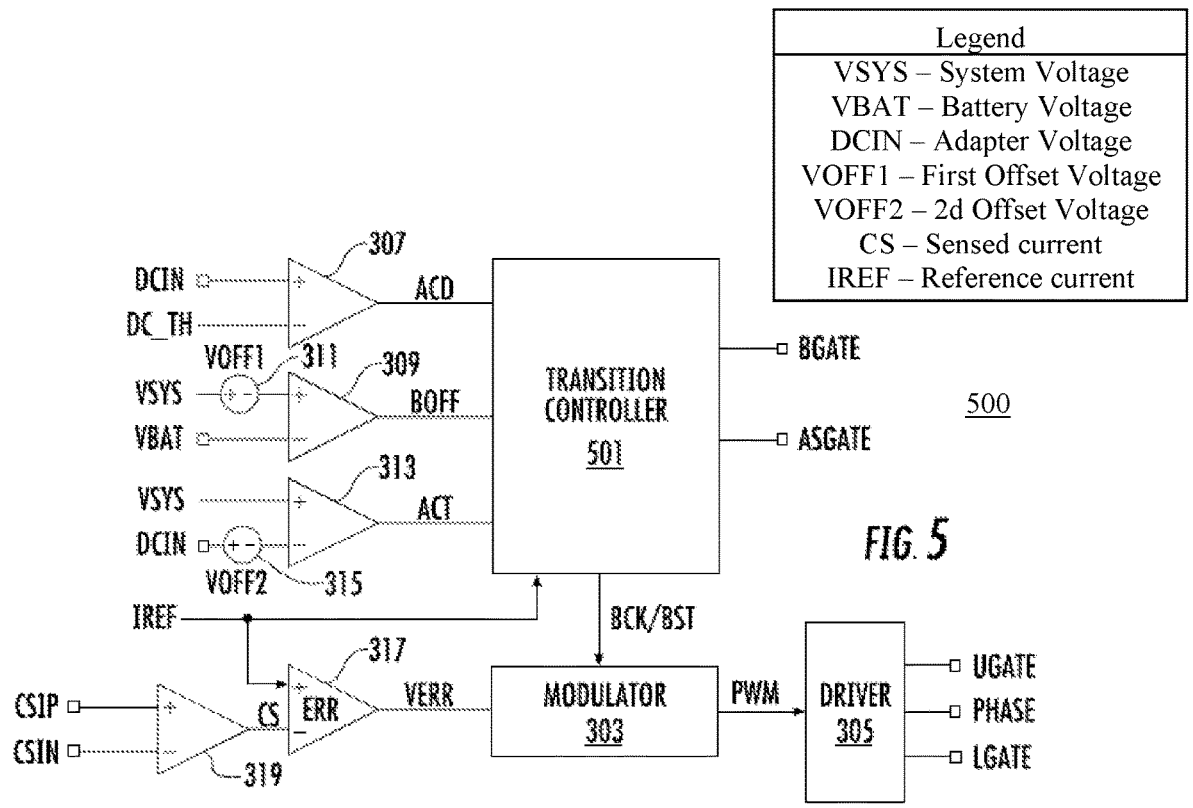
FIG. 5 is a simplified schematic and block diagram of a transition control system that may be implemented within the controller of FIG. 2 according to another embodiment.

FIG. 5 is a simplified schematic and block diagram of a transition control system 500 that may be implemented within the controller 207 according to another embodiment. The transition control system 500 is substantially similar to the transition control system 300 in which similar components assume the same reference numbers. In this case, an additional amplifier 319 is provided having its inputs coupled to the CSIP and CSIN pins and having an output providing a current sense signal CS having a voltage level indicative of IADP flowing through the sense resistor RS. CS is provided to one input (inverting) of the error amplifier 317, which receives a current reference signal IREF at its other input (non-inverting) and which provides VERR at its output to the modulator 303. IREF may be developed by any source, and is shown further provided to a transition controller 501 which replaces the transition controller 301. The transition controller 501 is substantially similar to the transition controller 301 except for operation of controlling ASGATE as further described herein.

Figure 6:
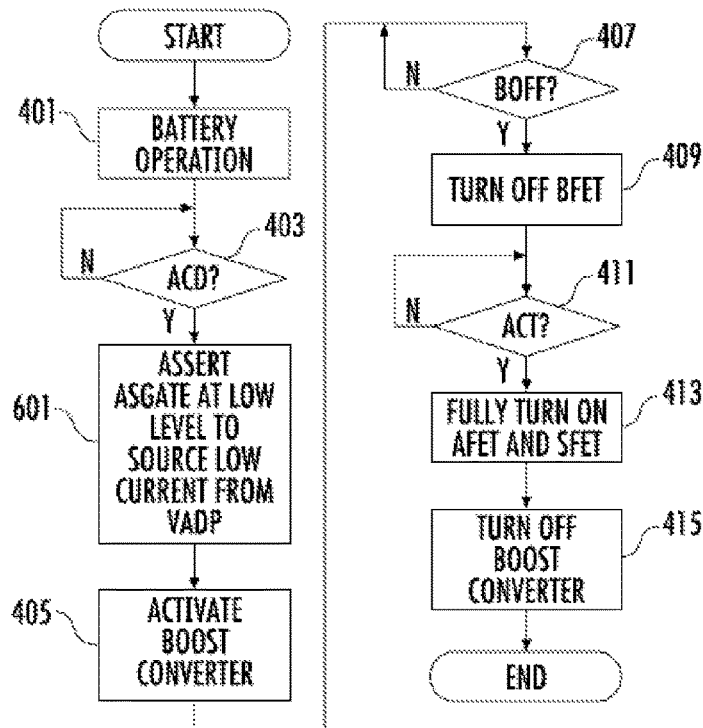
FIG. 6 is a flowchart diagram illustrating operation of the transition control system of FIG. 5 according to one embodiment.

FIG. 6 is a flowchart diagram illustrating operation of the transition control system 500 according to one embodiment. Operation of the transition control system 500 is substantially similar to the transition control system 300 in which similar operation blocks assume the same reference numerals. Operation begins the same with the detection of ACD during battery operation as shown by blocks 401 and 403. In this case, when the AC/DC adapter 203 is detected via assertion of ACD at block 403, operation does not proceed immediately to block 405 but instead advances to block 601, in which the transition controller 501 asserts ASGATE at a predetermined low level to allow a relatively small source current to flow from VADP to VSYS.

In this manner, instead of turning AFET and SFET fully on, the ASGATE is driven to a relatively low level or ramped up to a lower voltage level to partially turn on AFET and SFET. In one embodiment, the low current level is not sufficient to fully source a normal load level, but instead only high enough to supplement the source current to begin driving the load via VSYS. This low level activation of AFET and SFET is at a safe level to prevent any potential damage. In one embodiment, an initial current level of 100 milli-amperes (mA) is contemplated.

Operation then advances to block 405 in which the boost converter is activated in a similar manner as previously described. In this case, boost control is handled in a different manner as shown in FIG. 5. Rather than regulating the boost converter based on the voltage level of VSYS, the adapter current IADP is detected by the amplifier 317 via CSIP and CSIN and reflected by the current sense signal CS. IREF has a level reflective of the low initial adapter current level. In one embodiment, for example, IREF has a value for regulating IADP at the initial current level of 100 mA. In this manner, when the boost converter is activated, the modulator 303 controls Q1 and Q2 in boost mode to regulate IADP to the level set by IREF. Operation advances to block 407 to monitor BOFF in similar manner.

Although boost switching is regulated to maintain IADP at the low current level, the boost converter causes the voltage level of VSYS to increase relative to VBAT. In this manner, when VSYS rises above VBAT by VOFF1, the comparator 309 asserts BOFF as detected at block 407. Operation then advances to block 409 in which BFET is turned off, and then to block 411 to monitor ACT. Whenever the voltage level of VSYS rises to the VDC-VOFF2 as previously described, the comparator 313 asserts ACT and operation advances to block 413 in which the transition controller 501 asserts ASGATE to fully turn on AFET and SFET. Then the boost converter may be turned off at block 415 in which only the AC/DC adapter 203 provides the source power and transition operation is complete.

Figure 7:
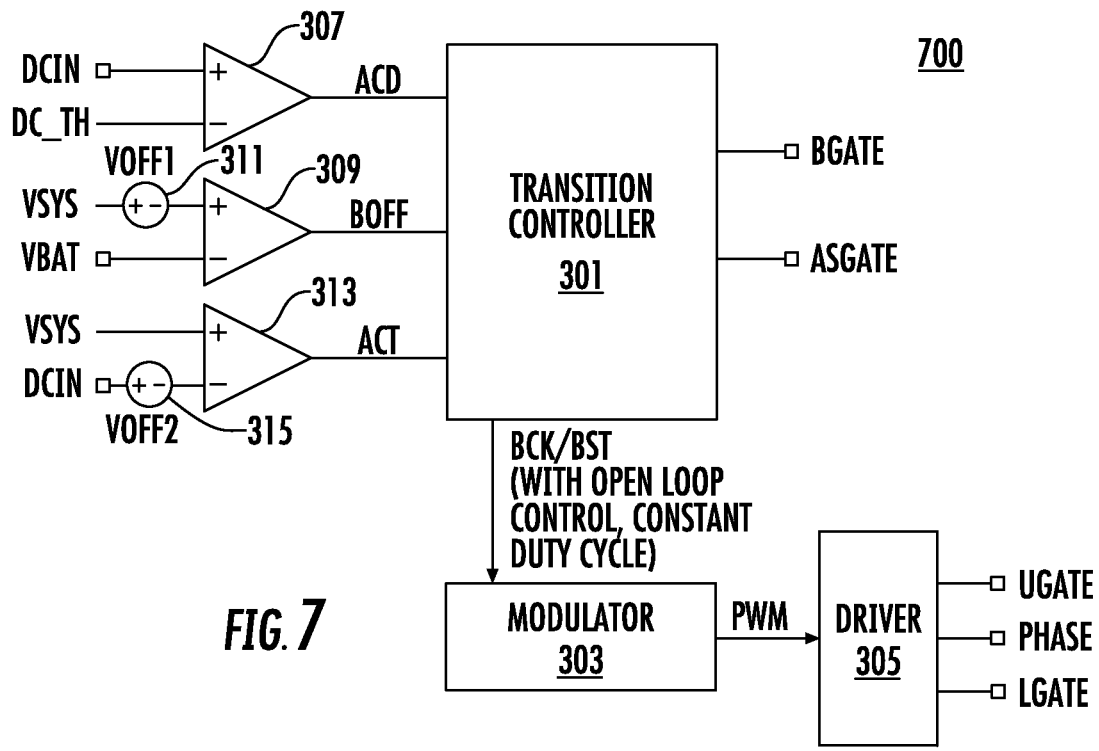
FIG. 7 is a simplified schematic and block diagram of a transition control system that may be implemented within the controller of FIG. 2 according to another embodiment.

FIG. 7 is a simplified schematic and block diagram of a transition control system 700 that may be implemented within the controller 207 according to another embodiment. The transition control system 700 is substantially similar to the transition control system 300 in which similar components assume the same reference numbers. In this case, operation is substantially similar except that the input control loop to the modulator 303 is not used or not provided. Instead, the transition controller 301 activates the modulator 303 to operate the switching converter as a boost converter with open loop control and with a constant duty cycle. The duty cycle may be fixed within the controller 207 or programmable via memory or fuse or the like.

Figure 8:
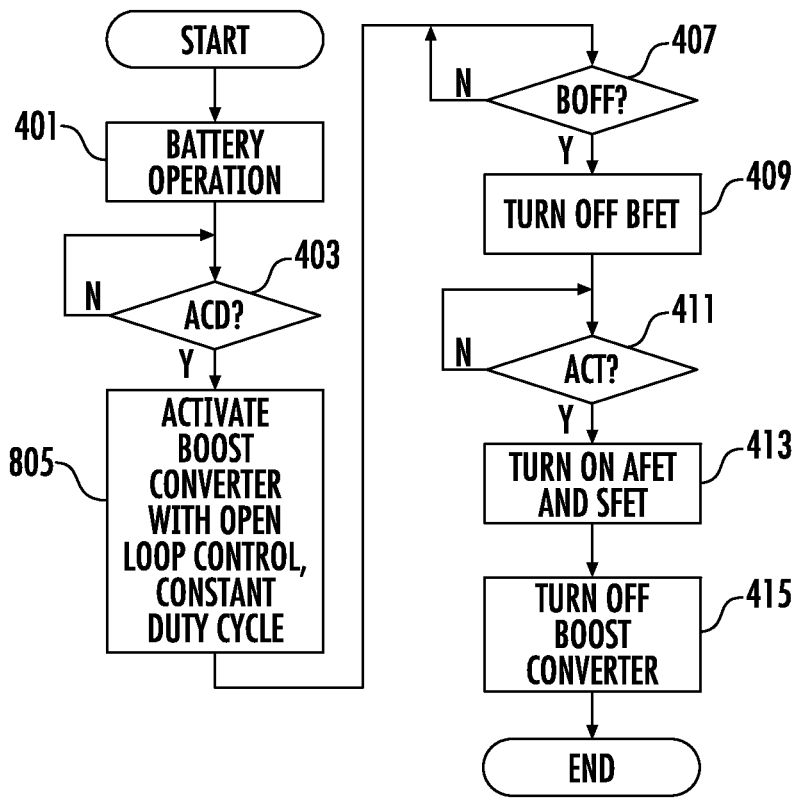
FIG. 8 is a flowchart diagram illustrating operation of the transition control system of FIG. 7 according to one embodiment.

FIG. 8 is a flowchart diagram illustrating operation of the transition control system 700 according to one embodiment. Operation of the transition control system 700 is substantially similar to operation of the transition control system 300. In this case, block 405 is replaced by block 805 in which the boost converter, when activated in response to ACD, is activated by the transition controller 301 to operate with open loop control at a constant duty cycle. Otherwise, operation is substantially similar in which the voltage level of VSYS rises above VBAT and eventually sufficiently close to VADP to fully turn on AFET and SFET.

The benefits, features, and advantages of the present invention are now better understood with regard to the foregoing description and accompanying drawings. The description has been presented to enable one of ordinary skill in the art to make and use the present invention as provided within the context of a particular application and its requirements. Various modifications will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed. For example, although the present invention has been described in considerable detail with reference to certain embodiments thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claim(s).

The invention claimed is:
1. A battery charge system, comprising:
an adapter node and a system node;
a battery;
a first isolation switch coupled between said adapter node and said system node;
a second isolation switch coupled between said battery and said system node;
a boost converter operative to boost a battery voltage of said battery to increase a system voltage on said system node when activated; and
a controller that turns off said first isolation switch and that turns on said second isolation switch during a battery mode, that activates said boost converter when an adapter voltage is detected on said adapter node, that turns off said second isolation switch when said system voltage rises above said battery voltage, and that turns on said first isolation switch when said system voltage rises to a predetermined operating voltage level.

2. The battery charge system of claim 1, wherein said controller turns off said second isolation switch when said system voltage is greater than said battery voltage by a first offset voltage, and wherein said controller turns on said first isolation switch when said system voltage is within a second offset voltage of a detect voltage indicative of said adapter voltage.

3. The battery charge system of claim 1, wherein said controller deactivates said boost converter after said first isolation switch is turned on.

4. The battery charge system of claim 1, wherein switching of said boost converter is controlled based on said system voltage compared with said detect voltage.

5. The battery charge system of claim 1, wherein said controller further turns on said first isolation switch at a low current level before activating said boost converter, and then fully turns on said first isolation switch when said system voltage reaches said predetermined operating voltage level.

6. The battery charge system of claim 5, wherein said boost converter is controlled to regulate said first isolation switch to maintain said low current level.

7. The battery charge system of claim 1, wherein said boost converter is controlled with open loop control at a constant duty cycle.

8. The battery charge system of claim 1, wherein said controller comprises:
a first comparator that compares a detect voltage indicative of said adapter voltage with a threshold voltage and that provides an adapter detect signal indicative thereof;
a second comparator that compares said system voltage with said battery voltage and that provides a boost signal indicative thereof;
a third comparator that compares said system voltage with said detect voltage and that provides an adapter transition signal indicative thereof;
a modulator for operating said boost converter; and
a transition controller that receives said adapter detect signal, said boost signal, and said adapter transition signal and that provides a first control signal to control said first isolation switch, a second control signal to control said second isolation switch, and a third control signal to said modulator to control activation of said boost converter.

9. The battery charge system of claim 8, further comprising an amplifier that receives said system voltage and said detect voltage and that provides an error signal to said modulator.

10. The battery charge system of claim 8, further comprising:
a current sensing system that detects current from said adapter node to said system node and that provides a current sense signal indicative thereof; and
an amplifier that receives said current sense signal and a reference signal and that provides an error signal to said modulator.

11. A controller for a battery charge system, comprising:
an adapter voltage sense input, a system voltage sense input, and a battery voltage sense input;
a first isolation switch output and a second isolation switch output;
a modulator system having a boost control output;
a comparator system that compares a voltage of said adapter voltage sense input with a threshold voltage and that provides an adapter detect signal indicative thereof, that compares a voltage of system voltage sense input with a voltage of said battery voltage sense input and that provides a battery off signal indicative thereof, and that compares said voltage of system voltage sense input with said voltage of said adapter voltage sense input and that provides an adapter transition signal indicative thereof; and
a transition controller that is operative to place said first isolation switch output in an off state and to place said second isolation switch output in an on state when said adapter detect signal indicates a battery mode, to activate said modulator in a boost mode in response to transition of said adapter detect signal, to place said second isolation switch output in an off state in response to transition of said battery off signal, and to place said first isolation switch output in an on state in response to transition of said adapter transition signal.

12. The controller of claim 11, wherein said comparator system transitions said adapter detect signal when said voltage of said adapter voltage sense input rises above a predetermined voltage threshold, wherein said comparator system transitions said battery off signal when said voltage of system voltage sense input is greater than said voltage of said battery voltage sense input by a first offset voltage, and wherein said comparator system transitions said adapter transition signal when said voltage of system voltage sense input is within a second offset voltage of said voltage of said adapter voltage sense input.

13. The controller of claim 11, wherein said transition controller is further configured to deactivate said modulator from boost mode after said first isolation switch output is placed in an on state.

14. The controller of claim 11, wherein said modulator operates with open loop control and constant duty cycle while in said boost mode.

15. The controller of claim 11, further comprising:
an amplifier that receives said voltage of system voltage sense input and said voltage of said adapter voltage sense input and that provides an error signal indicative thereof; and
wherein said modulator modulates based on said error signal while in said boost mode.

16. The controller of claim 11, further comprising:
a current sense input coupled to a current sense device for providing a current sense signal indicative of an adapter current level;

an amplifier that receives said current sense signal and a current reference value and that provides an error signal indicative thereof; and wherein said modulator modulates based on said error signal while in said boost mode.

17. The controller of claim 16, wherein said transition controller is further operative to place said first isolation switch output in a partially on state in response to said transition of said adapter detect signal while in said battery mode, and then to place said first isolation switch output in a fully on state in response to said transition of said adapter transition signal.

18. A method of controlling a battery charge system, comprising:

operating in a battery mode including isolating an adapter node from a system node when an AC adapter is not detected at the adapter node;

activating a boost converter mode to boost a battery voltage of a battery to increase a system voltage on the system node when the AC adapter is detected in the adapter node;

isolating the battery from the system node when a system voltage of the system node rises above the battery voltage; and coupling the adapter node to the system node when the system voltage reaches a predetermined operating voltage level.

19. The method of claim 18, further comprising:

partially coupling the adapter node to the system node at a low current level when the AC adapter is initially detected; and fully coupling the adapter node to the system node when the system voltage reaches the predetermined operating voltage level.

20. The method of claim 18, further comprising:

monitoring a current level between the adapter node and the system node and providing a current sense signal indicative thereof; and controlling the boost converter mode based on the current sense signal.

21. The method of claim 18, further comprising deactivating the boost converter mode when the system voltage reaches the predetermined operating voltage level.

* * * * *